July 15, 1924.
J. H. McCAFFREY
1,501,712
RULE
Filed Dec. 23, 1920
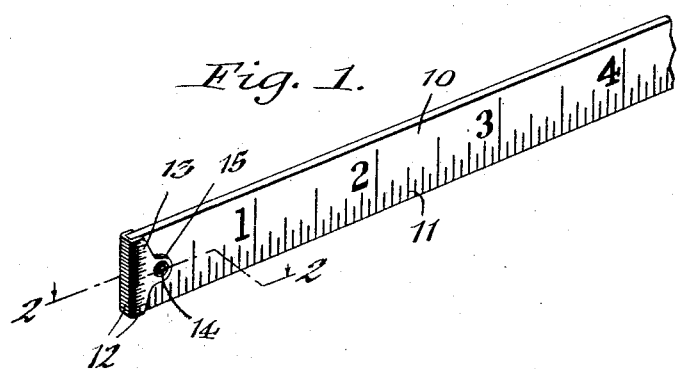
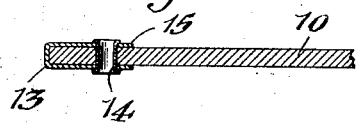
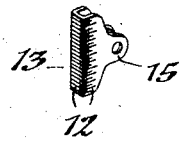 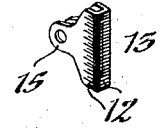
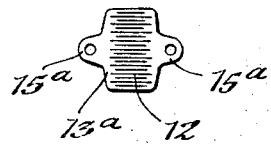
Inventor;
James H. McCaffrey,
by Geyer Popp
Attorneys.

Patented July 15, 1924.

1,501,712

UNITED STATES PATENT OFFICE.

JAMES H. McCAFFREY, OF BUFFALO, NEW YORK.

RULE.

Application filed December 23, 1920. Serial No. 432,807.

*To all whom it may concern:*

Be it known that I, JAMES H. MCCAFFREY, a citizen of the United States, residing at Buffalo, in the county of Erie and State of New York, have invented new and useful Improvements in Rules, of which the following is a specification.

The main object of this invention is to provide a rule which permits measurements to be accurately taken in small openings or other restricted spaces into which a whole section of an ordinary folding rule cannot be inserted.

A further object is to provide the ends of the rule with guards or protectors which receive the wear or abrasion due to contact with moving work, thus relieving the body of the rule from such wear, preventing shortening thereof and insuring accurate measurements after the rule has been in use for a considerable time, as well as when it is new.

In the accompanying drawings: Figure 1 is a fragmentary, perspective view of a rule or rule-section embodying the improvement. Figure 2 is an enlarged longitudinal section on line 2—2, Fig. 1. Figures 3 and 4 are perspective views of the graduated protector taken from opposite sides thereof. Figure 5 is a plan view of the protector in blank form.

Similar characters of reference indicate corresponding parts throughout the several views.

The improvement is shown as applied to a rule or rule-section 10 constructed of aluminum and provided with the customary scale or graduations 11 running lengthwise thereof.

In addition to this ordinary longitudinal scale, the rule is provided at each end with a transverse measuring scale consisting of graduations 12, preferably smaller or finer than those of the rule proper, these graduation-lines being disposed lengthwise of the rule or substantially at right angles to the main graduations 11. Each of these transverse scales is preferably formed on a protector or guard 13 in the form of a substantially U-shaped clip which embraces the end and adjacent sides of the rule, and extends the full width thereof, as shown in Figs. 1 and 2. This clip may be secured to the body of the rule in any suitable manner, but preferably by means of a hollow rivet 14 which passes through perforated ears 15 formed on the side portions of the clip.

In their preferred form, the graduations of the transverse scale extend continuously along one side of the clip, thence across its end and thence along its other side, as shown in the drawings, whereby measurements may be conveniently taken at the end or on either side of the transverse scale.

By providing the rule with this auxiliary scale, measurements may be conveniently and accurately taken of small openings or of parts located in limited spaces where it would be impossible to use the usual scale running lengthwise of the rule on account of the length of the rule-sections.

The clips or protectors are preferably constructed of a relatively harder material than that of the rule-body, for instance, brass which is harder than aluminum and therefore more wear-resisting. By this construction, the ends of the rule are protected against wear due to abrasion, for example, in holding them against a turning or rotating object while in the act of measuring it. Furthermore, by providing the ends of the rule with such protecting clips, shortening of the rule is prevented and inaccuracies of measurement are avoided.

The protecting clip may be formed in a single piece from a flat blank of sheet metal of the shape shown in Fig. 5. This blank comprises a body portion 13ª and attaching ears 15ª extending from opposite sides thereof. The series of auxiliary graduations 12 extend substantially from top to bottom of the body portion of the blank, so that upon doubling the blank to the form shown in Figs. 3 and 4, these graduations extend continuously from one side of the clip to the other.

The device while performing the double function of an end-protector and a transverse scale, can be cheaply produced and easily applied to rules now in use as well as new rules.

I claim as my invention:

1. A rule having a U-shaped clip embracing its end and its sides, said clip having a series of graduations arranged transversely of the end of the rule and extending continuously from one side of the clip to the other, and means for securing said clip to the rule.

2. An attachment for rules, consisting of a U-shaped clip adapted to embrace the end and adjacent side portions of a rule, said clip having graduations arranged transversely of its closed end and extending continuously from one side of the clip to the other.

JAMES H. McCAFFREY.